US012644281B2

(12) United States Patent
Li et al.

(10) Patent No.: US 12,644,281 B2
(45) Date of Patent: Jun. 2, 2026

(54) STEEL-TIMBER COMPOSITE SHEAR WALL WITH LAYERED STEEL PLATES AND TIMBER COVER PLATES

(71) Applicant: Tongji University, Shanghai (CN)

(72) Inventors: Zheng Li, Shanghai (CN); Minjuan He, Shanghai (CN); Yijing Wang, Shanghai (CN); Chong'er Wang, Shanghai (CN)

(73) Assignee: Tongji University, Shanghai (CN)

( * ) Notice: Subject to any disclaimer, the term of this patent is extended or adjusted under 35 U.S.C. 154(b) by 191 days.

(21) Appl. No.: 18/620,298

(22) Filed: Mar. 28, 2024

(65) Prior Publication Data

US 2024/0368886 A1 Nov. 7, 2024

(30) Foreign Application Priority Data

May 4, 2023 (CN) .......................... 202310487919.7

(51) Int. Cl.
| | |
|---|---|
| *E04C 2/00* | (2006.01) |
| *B32B 3/26* | (2006.01) |
| *B32B 7/08* | (2019.01) |
| *B32B 15/06* | (2006.01) |
| *B32B 15/10* | (2006.01) |
| *B32B 15/18* | (2006.01) |
| *E04B 2/00* | (2006.01) |
| *E04C 2/26* | (2006.01) |

(52) U.S. Cl.
CPC ................ *E04C 2/26* (2013.01); *B32B 3/266* (2013.01); *B32B 7/08* (2013.01); *B32B 15/06*

(2013.01); *B32B 15/10* (2013.01); *B32B 15/18* (2013.01); *E04C 2/46* (2013.01); *B32B 2607/00* (2013.01)

(58) Field of Classification Search
CPC .. E04C 2/26; B32B 7/08; B32B 15/10; B32B 2607/00
See application file for complete search history.

(56) References Cited

U.S. PATENT DOCUMENTS

| | | | |
|---|---|---|---|
| 10,273,638 B1 * | 4/2019 | Penland, Jr. .............. | E01C 5/18 |
| 2006/0057345 A1 * | 3/2006 | Surace .................... | B32B 21/08 |
| | | | 428/464 |
| 2015/0086747 A1 * | 3/2015 | Beuchel .............. | B32B 37/1207 |
| | | | 428/480 |
| 2018/0152253 A1 * | 5/2018 | Bell ........................ | B32B 7/06 |

(Continued)

*Primary Examiner* — Basil S Katcheves
(74) *Attorney, Agent, or Firm* — Thompson Coburn LLP; Steven M. Ritchey

(57) ABSTRACT

A steel-timber composite shear wall with layered steel plates and timber cover plates is provided in the present disclosure, including a rubber layer, with a first thin low yield point (LYP) steel plate and a second thin structural steel plate respectively arranged on both sides of the rubber layer. A first timber cover plate and a second timber cover plate are respectively arranged outside the first thin LYP steel plate and the second thin structural steel plate. The steel plate and the timber cover plate are fixed through self-tapping screws. The grain of the first and second timber cover plates are arranged obliquely, and the oblique angles are determined based on height and width of the timber cover plate. Compared with the prior art, the shear wall has the advantages of environment friendliness, good buckling restraint performance, high lateral stiffness, multi-stage load resisting mechanism, and high prefabrication rate.

10 Claims, 6 Drawing Sheets

Partially enlarged right side view

(56) References Cited

U.S. PATENT DOCUMENTS

2018/0320370 A1* 11/2018 Letts ........................ B32B 17/10
2019/0013002 A1*  1/2019 Succi ........................ B32B 3/06
2019/0030862 A1*  1/2019 Akiyama ................. H04R 7/06
2019/0277082 A1*  9/2019 Millard ................... B32B 37/18
2020/0101710 A1*  4/2020 Clausi ..................... B32B 21/02

* cited by examiner

Partially enlarged
right side view

STEEL-TIMBER COMPOSITE SHEAR WALL WITH LAYERED STEEL PLATES AND TIMBER COVER PLATES

CROSS-REFERENCE TO RELATED APPLICATION

This patent application claims the benefit and priority of Chinese Patent Application No. 202310487919.7 filed with the China National Intellectual Property Administration on May 4, 2023, the disclosure of which is incorporated by reference herein in its entirety as part of the present application.

TECHNICAL FIELD

The present disclosure relates to the technical field of steel-timber composite structures in structural engineering, in particular to a steel-timber composite shear wall with layered steel plates and timber cover plates.

BACKGROUND

Steel plate shear walls, a new type of lateral-resistant members with good lateral resistant performance, entered the construction field in the 1970s. However, thin steel plates easily tear when subjected to out-of-plane buckling, showing low seismic performance and ductility.

In the prior art, multistage fortification mechanism of a double-layer steel plate with one layer of thin low yield point (LYP) steel plate and one layer of thin structural steel plate is adopted. From the perspective of seismic performance, the double-layer steel plate is strong in lateral resistance. Moreover, the double-layer steel plate is configured with one layer of thin low yield point (LYP) steel plate and one layer of structural steel plate, and a rubber layer is added between the two steel plates as a buffer. The thin low yield point (LYP) steel plate is engaged in lateral resistance at first. Due to long circular holes slotted in the upper and lower sides, the structural steel plate slides under lateral forces before it is locked at the slotted holes, and is engaged for lateral resistance after being locked. Since the structural steel plate is later used for lateral resistance than the low yield point (LYP) steel plate, the concept of multistage fortification is embodied, and multiple seismic fortifications are set up.

However, for most of the current buckling restrained steel plate shear walls, concrete cover plates are used as out-of-plane buckling restraints of steel plates. During the buckling process of steel plates, the cover plates easily crack due to the brittleness of the concrete. In addition, concrete is highly energy-consuming and has high carbon emissions, which is not conducive to environmental protection.

In order to improve the ultimate bearing capacity of the shear walls, timber plates are used as out-of-plane and buckling restraints for the steel plates. From the perspective of seismic performance and practicality, timber is lighter than concrete in weight. The use of timber plates as cover plates allows for factory prefabrication and on-site installation, with the advantage of convenient lifting and installation, which is in line with the development concept of the modern construction industry. From the perspective of environmental protection, timber is renewable, while concrete is not. If concrete cover plates are replaced by timber plates to be used as out-of-plane restraints for the steel plates, renewable resources can be better utilized, which is more meaningful for environmental protection.

SUMMARY

The purpose of the present disclosure is to provide a steel-timber composite shear wall with layered steel plates and timber cover plates with efficient buckling restraint and high lateral stiffness to overcome the above defects in the prior art.

The purpose of the present disclosure can be achieved through the following technical solution:

The steel-timber composite shear wall with layered steel plates and timber cover plates includes a first thin low yield point (LYP) steel plate, a rubber layer, a second thin structural steel plate, and two timber cover plates. The first thin low yield point (LYP) steel plate and the second thin structural steel plate are arranged on both sides of the rubber layer. The first timber cover plate is arranged outside the first thin low yield point (LYP) steel plate, and the second timber cover plate is arranged outside the second thin structural steel plate. The steel plates are fixed with the timber cover plates through self-tapping screws. A grain direction of the timber of the first and the second timber cover plates is arranged obliquely, and an oblique angle is determined based on a height and a width of the corresponding timber cover plate.

Further, the grain direction of the timber of the first timber cover plate is opposite to the grain direction of the timber of the second timber cover plate.

Further, the oblique angle of the grain direction of the timber of the first timber cover plate and the second timber cover plate is indicated by a formula as follows: $\alpha = H/B$, wherein a is an oblique angle, H is a height of the timber cover plate, and B is a width of the timber cover plate.

Further, the first thin low yield point (LYP) steel plate and the second thin structural steel plate are connected to a frame through connectors.

Further, distances between upper and lower sides of the timber cover plates are shorter than that of the steel plates; gaps are formed between upper and lower edges of the steel plates and the frame, and the connectors for connecting the steel plates and the frame are mounted in the gaps.

Further, first bolt holes are formed in upper and lower sides of the first thin low yield point (LYP) steel plate, and second bolt holes are formed in upper and lower sides of the second thin structural steel plate; high-strength bolts are drilled through the first bolt holes and the second bolt holes to fix the steel plates, the connectors and the frame beam together.

Further, the first bolt holes in the first thin low yield point (LYP) steel plate are circular holes.

Further, the second bolt holes in the second thin structural steel plate are long circular holes.

Further, the first thin low yield point (LYP) steel plate, the rubber layer and the second thin structural steel plate are connected with the first timber cover plate and the second timber cover plate through the self-tapping screws.

Further, the self-tapping screws are drilled in from surfaces of the timber cover plates on both sides, and the self-tapping screws on one side pass through the steel plate on that side without passing through the steel plate on another side.

Compared with the prior art, the present disclosure achieves the following advantages:

Firstly, in the present disclosure, the timber cover plates are used as buckling-restraining members, which can effectively restrict out-of-plane buckling of the thin steel plate shear wall, improving structural bearing capacity and lateral stiffness of the shear wall. From the perspective of seismic performance and practicability, timber is lighter than concrete. From the perspective of environmental protection, the timber cover plates are used as the buckling-restraining members, thus timber, a renewable resource is utilized. Moreover, the timber cover plates have non-structural functions such as sound insulation, heat preservation, and decoration.

Secondly, in the present disclosure, the timber cover plates are fixed by the self-tapping screws, which has the advantages of simple and convenient construction, and the benefits of using the timber structures as the cover plates are fully utilized. The timber cover plates are used as the buckling-restraining members, and the steel plates connected on both sides are used as the lateral resistant members. Structure and construction are simple and with high assembly, width and thickness can be flexibly modified according to different needs, which follows the development concept of modern construction industry.

Thirdly, in the present disclosure, grain direction of timber of the timber cover plates is arranged obliquely, and the oblique angle is related to the height and width of the timber cover plates. Because the area of the steel plates covered by the timber cover plates is the lateral-resisting effect region, the grain direction of timber of the timber cover plates is basically inclined along a direction of the tension field of the steel plates. Because the out-of-plane buckling of the steel plates causes a buckling half-wave in the direction of the tension field during lateral resistance, and timber has high strength parallel to the grain. From the perspective of mechanical performance, the strength parallel to the grain of the timber is fully utilized, so that the buckling restraint is more efficient, and the use of materials is more economical. The direction of the tension field of the steel plates is reversed during reciprocating motion, so the oblique angle of the grain direction of the timber cover plate outside the first thin low yield point (LYP) steel plate is opposite to that of the timber cover plate outside the second thin structural steel plate, ensuring that the grain direction of one timber cover plate is always the same as the direction of the tension field of the steel plates during the reciprocating motion, fully utilizing the strength of timber parallel to the grain.

Fourthly, compared with the shear wall with single-layer steel plate, the shear wall with double steel plates in the present disclosure has higher lateral stiffness, and the thin low yield point (LYP) steel plate and the thin structural steel plate are arranged according to the concept of multistage fortification. The two steel plates have different material properties and structural forms. The thin low yield point (LYP) steel plate is the first to resist lateral forces. Due to the long-circular slotted holes in upper and lower sides of the structural steel plate, before the high-strength bolts are locked at the long-circular slotted holes, the slotted holes in the upper and lower sides of the structural steel plate play a similar role as sliding friction dampers, ensuring that the structural steel plate is later used for lateral resistance than the low yield point (LYP) steel plate, achieving multistage fortification of the steel plates. When locked at the slotted holes, the structural steel plate begins to resist lateral forces. So that the concept of multistage fortification of the steel plate is embodied, and characteristics of different materials are fully utilized.

Figure 1:
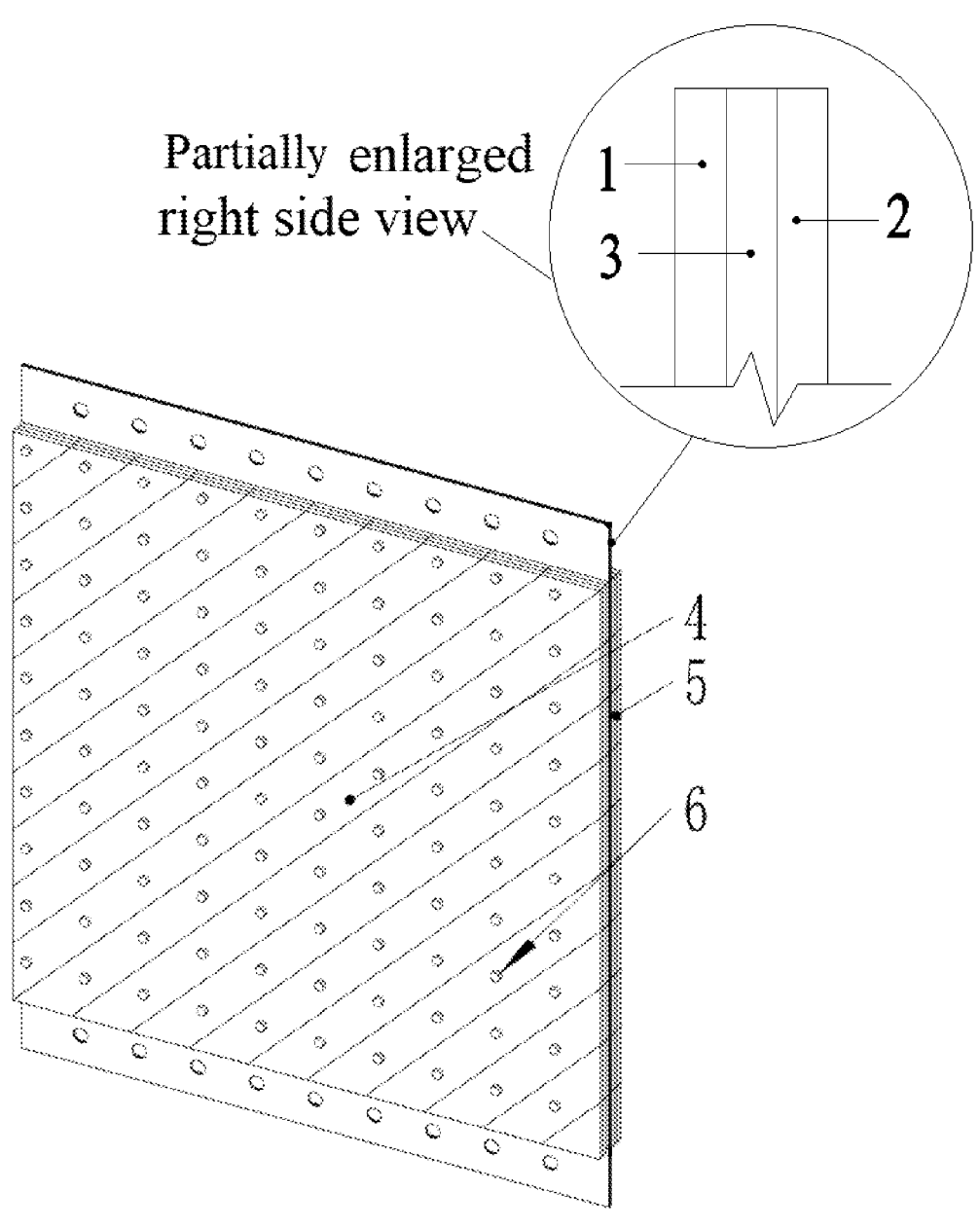
FIG. 1 is a structural diagram of the present disclosure.

Reference signs: 1 first thin low yield point (LYP) steel plate; 11 first bolt hole; 2 second thin structural steel plate; 21 second bolt hole; 3 rubber layer; 4 first timber cover plate; 5 second timber cover plate; and 6 self-tapping screw.

DETAILED DESCRIPTION OF THE EMBODIMENTS

The technical solutions in the embodiments of the present disclosure will be described clearly and completely below with reference to the drawings in the embodiments of the present disclosure. Apparently, the described embodiments are merely a part but not all of the embodiments of the present disclosure. Generally, the components in the embodiments of the present disclosure described and illustrated in the drawings can be arranged and designed through different configurations.

Therefore, the detailed descriptions below for the embodiments of the present disclosure provided in the drawings are not intended to restrict the claimed scope of the present disclosure, but merely represent the selected embodiments of the present disclosure. Based on the embodiment in the present disclosure, all other embodiments obtained by those skilled in the art under the premise of without contributing creative labor fall into the claimed scope of the present disclosure.

Embodiment I

In order to embody the structural concept of multistage fortification, solve the problems that the concrete cover plate of the traditional steel plate shear wall for buckling restraint is prone to cracks and has a poor ductility, and meet the requirements of building assembly, carbon reduction, environmental protection and material saving, a steel-timber composite shear wall with layered steel plates and timber cover plates is provided in the present disclosure. A schematic diagram of a structure of the shear wall is shown in FIG. 1, the front view of the shear wall is shown in FIG. 2, and the rear view of the shear wall is shown in FIG. 3.

The steel-timber composite shear wall with layered steel plates and timber cover plates in the present disclosure embodies the anti-seismic concept of multistage fortification. Moreover, the timber structure cover plates are used as the buckling-restraining members of the steel plate shear wall, so that the shortcomings of the concrete cover plates of the traditional buckling restrained steel plate shear wall, such as prone to cracks, poor ductility, and large weight are improved while the buckling restraint requirements of the steel plate shear wall are met. Moreover, the grains of the timber plates are arranged obliquely along the direction of the tension field of the steel plates, sufficiently utilizing the material properties parallel to the grain of the timber and reflecting the design concepts of energy saving and environmental protection.

As shown in FIG. 1, the steel-timber composite shear wall with layered steel plates and timber cover plates includes a first thin low yield point (LYP) steel plate 1, a second thin structural steel plate 2, a rubber layer 3, a first timber cover plate 4, a second timber cover plate 5, and self-tapping screws 6, wherein the rubber layer 3 is arranged between the first thin low yield point (LYP) steel plate 1 and the second thin structural steel plate 2, and the first timber cover plate 4 and the second timber cover plate 5 are arranged outsides the first thin low yield point (LYP) steel plate 1 and the second thin structural steel plate 2, respectively. The first timber cover plate 4 was fixed onto the first thin low yield point (LYP) steel plate 1 by drilling the self-tapping screws 6 through the two plates. The second structural steel plate 2 and the second timber cover plate 5 are drilled in the self-tapping screws 6 from another opposite side of the steel-timber composite shear wall to fix the second timber cover plate 5 onto the second structural steel plate 2. The self-tapping screws 6 are respectively drilled in from the surfaces of the timber cover plates on both sides of the steel-timber composite shear wall, and the self-tapping screws 6 on one side pass through the steel plate on that side without passing through the steel plate on another side. The first thin low yield point (LYP) steel plate 1 and the second thin structural steel plate 2 are connected to the frame beam through connectors. Distance between upper and lower sides of the timber cover plates is shorter than that of the steel plates; gaps are formed between the steel plates and the frame beam, and the connectors are mounted in the gaps.

Figure 2:
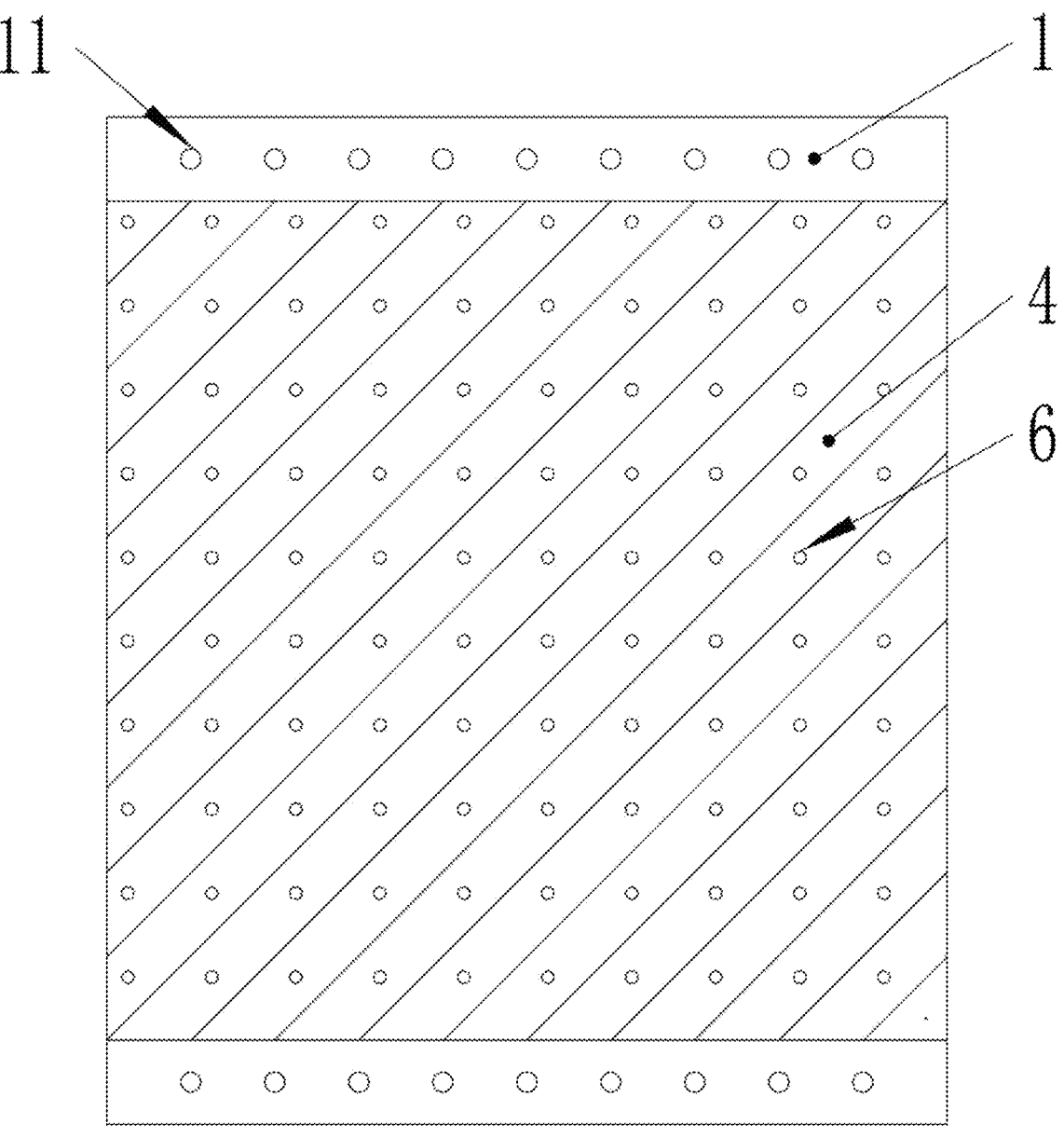
FIG. 2 is a front view of a structure of a shear wall in the present disclosure.
Figure 3:
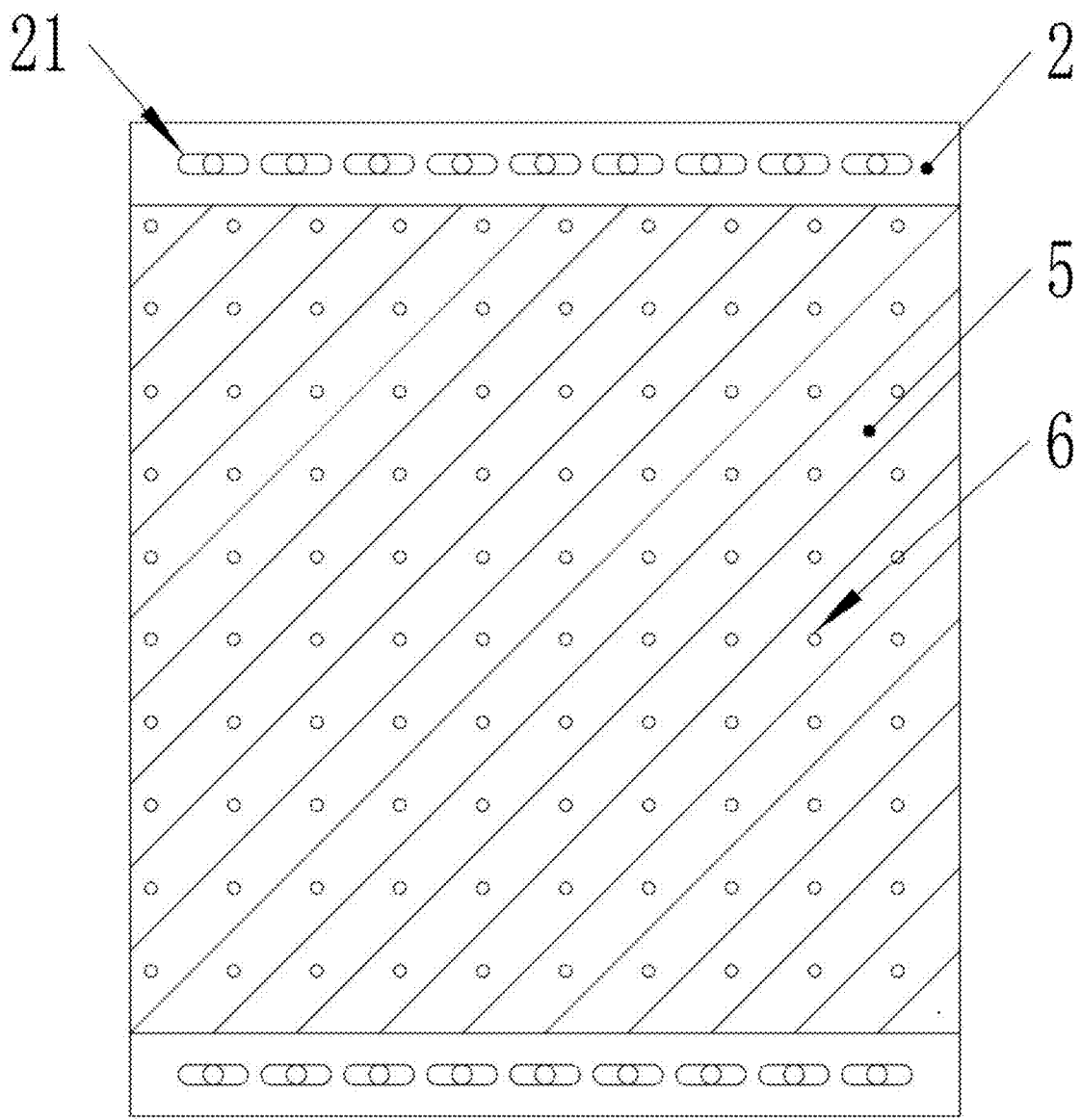
FIG. 3 is a rear view of a structure of a shear wall in the present disclosure.

As shown in FIG. 2, the first bolt holes 11 used for connecting high-strength bolts are formed in the upper and lower sides of the first thin low yield point (LYP) steel plate 1. The grain direction of the first timber cover plate 4 is arranged obliquely, the oblique angle is related to the height-width ratio of the timber cover plate, and the first timber cover plate 4 is fixed on the first thin low yield point (LYP) steel plate 1 through the self-tapping screws 6.

As shown in FIG. 3, the second bolt holes 21 used for connecting high-strength bolts are formed in the upper and lower sides of the second thin structural steel plate 2. The grain direction of second timber cover plate 5 is arranged obliquely, the oblique angle is related to the height-width ratio of the timber cover plate, and the oblique direction is opposite to that of the first timber cover plate 4. The second timber cover plate 5 is fixed on the second thin structural steel plate 2 through the self-tapping screws 6.

Figure 4:
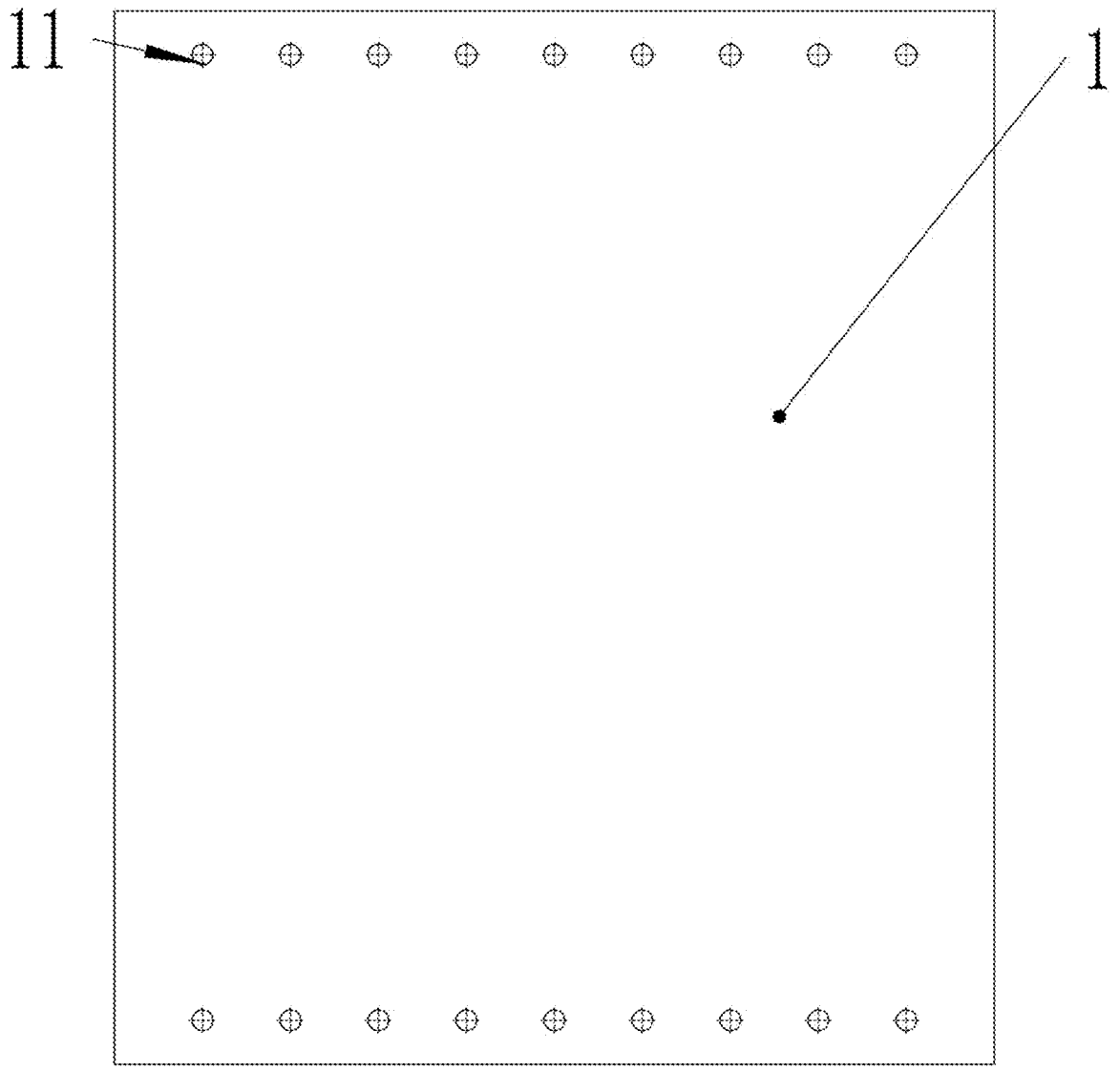
FIG. 4 is a schematic diagram of a structure of a thin low yield point (LYP) steel plate in the present disclosure.
Figure 5:
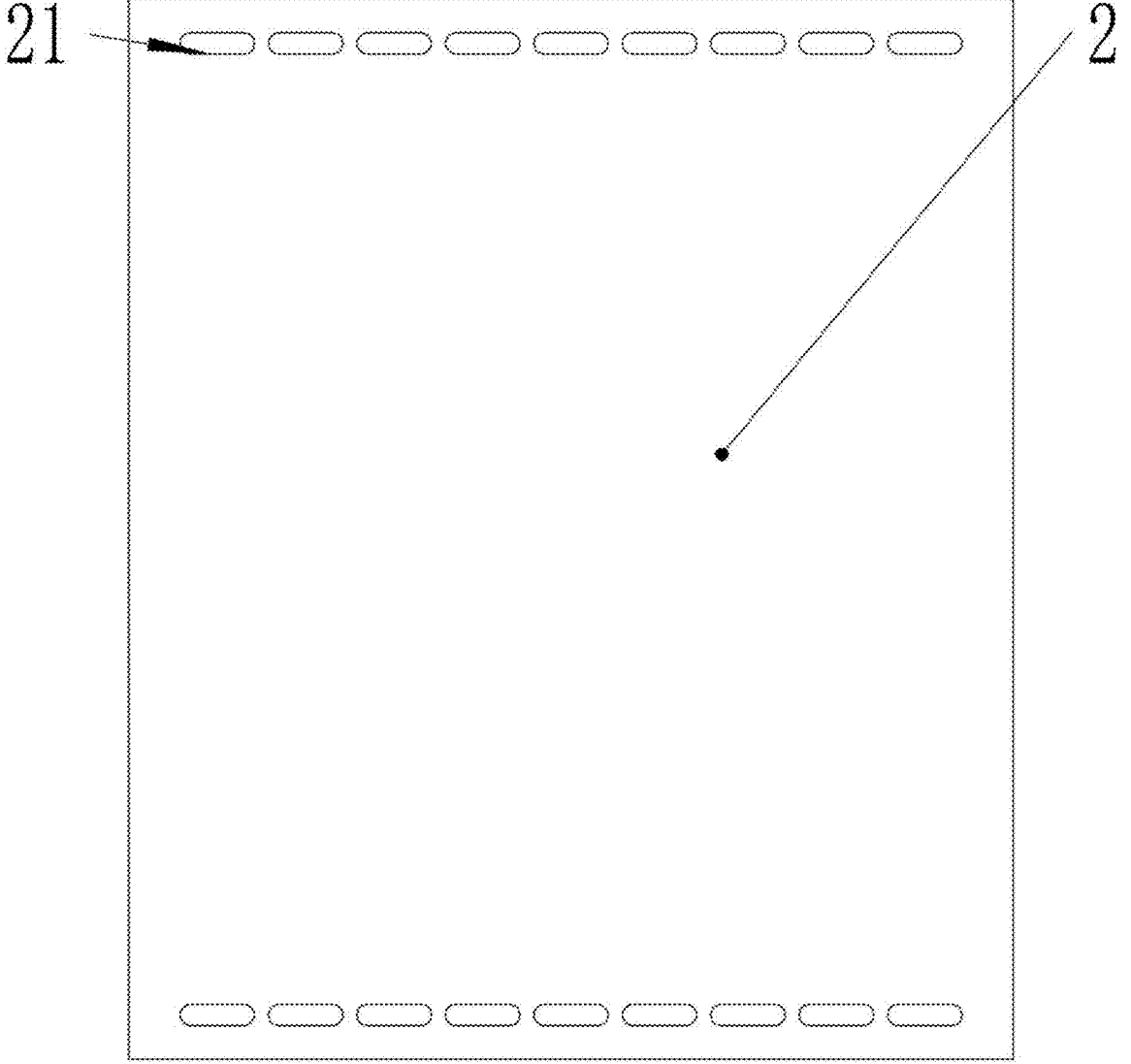
FIG. 5 is a schematic diagram of a structure of a thin structural steel plate in the present disclosure.

FIG. 4 is a schematic diagram of a structure of a thin low yield point (LYP) steel plate in the present disclosure; FIG. 5 is a schematic diagram of a structure of a thin structural steel plate in the present disclosure. As shown in FIGS. 4 and 5, the first thin low yield point (LYP) steel plate bolt holes 11 used for connecting high-strength bolts are formed in the upper and lower sides of the first thin low yield point (LYP) steel plate 1, and second thin structural steel plate bolt holes 21 used for connecting high-strength bolts are formed in the upper and lower sides of the second thin structural steel plate 2. The first bolt holes 11 in the first thin low yield point (LYP) steel plate are circular holes, and the second bolt holes 21 in the second thin structural steel plate are long-circular holes. The high-strength bolts pass through the first bolt holes 11 and the second bolt holes 21 to fix the steel plates, the connectors and the frame beam together.

Figure 6:
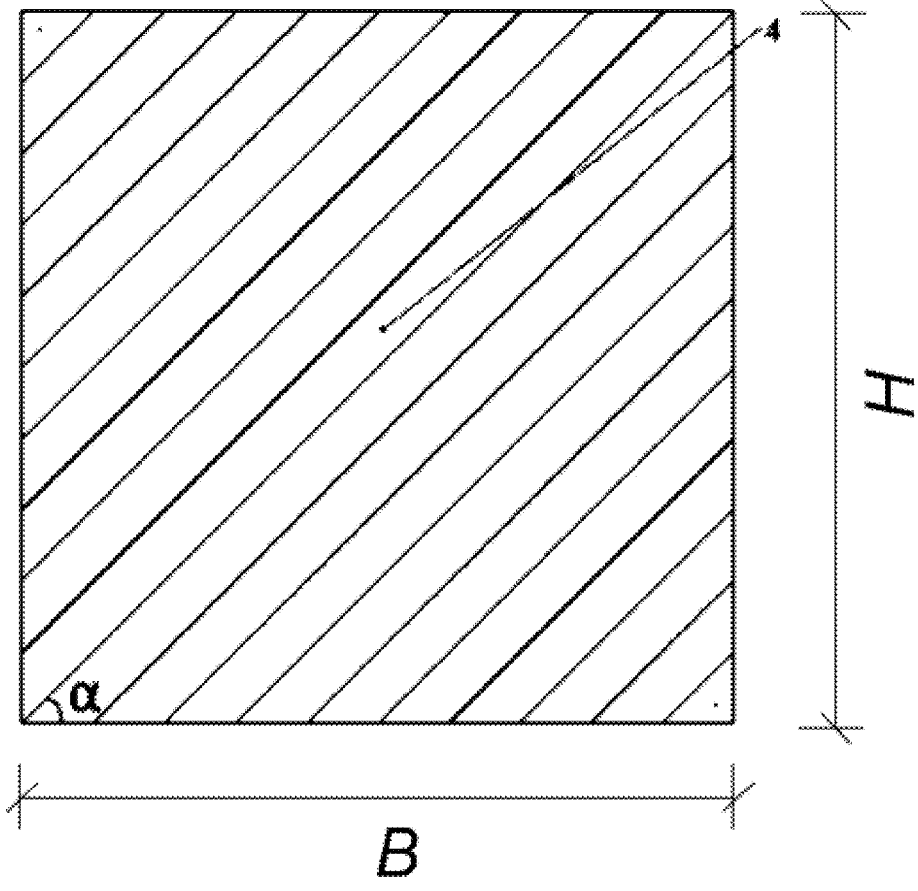
FIG. 6 is a schematic diagram of a structure of a timber cover plate in the present disclosure.

FIG. 6 is a schematic diagram of a structure of a timber cover plate in the present disclosure. As shown in FIG. 6, the grain direction of the first timber cover plate 4 and the second timber cover plate 5 is angulated with the horizontal direction. Only the first timber cover plate 4 is shown in FIG. 6, and the oblique angle is related to the height and width of the timber cover plate, and the oblique grain directions of the first timber cover plate 1 is opposite to that of the second timber cover plate 2 when the timber cover plates are arranged. The oblique angle is indicated by a formula as follows: $\alpha=H/B$, wherein $\alpha$ is the oblique angle, H is the height of the timber cover plate, and B is the width of the timber cover plate.

Combined with the above structural description, the installation process of the shear wall is as follows.

During prefabrication, the first thin low yield point (LYP) steel plate 1 and the second thin structural steel plate 2 are arranged on both sides of the rubber layer in an alignment way. The two steel plates sandwich the rubber layer 3, and are provided with circular holes and slotted holes in an alignment location in upper and lower sides thereof. Both the first timber cover plate 4 and the second timber cover plate 5 are the same as that of the steel plate in width of the horizontal direction, and slightly narrower than that of the steel plate in the vertical direction to leave space for installing the connectors onto the frame beam. The grain direction of the timber cover plate is inclined at an angle with the horizontal direction.

During installation, the first thin low yield point (LYP) steel plate 1, the rubber layer 3, and the second thin structural steel plate 2 are arranged in sequence, and bolted connection is carried out with edge members through the first bolt holes 11 and the second bolt holes 21 formed in the upper and lower sides of the steel plates. Then, the first timber cover plate 4 and the second timber cover plate 5 are respectively fixed onto the first thin low yield point (LYP) steel plate 1 and the second structural steel plate 2 by the self-tapping screws 6, and the oblique direction of the grain of the first timber cover plate 4 is opposite to the oblique direction of the grain of the second timber cover plate 5.

To sum up, a steel-timber composite shear wall with layered steel plates and timber cover plates is provided in the present disclosure. With the concept of multistage fortification, the thin low yield point (LYP) steel plate and the thin structural steel plate resist structural lateral forces in sequence. The timber cover plates as buckling-restraining members are arranged outside the steel plates to form the steel-timber composite shear wall with layered steel plates and timber cover plates with a good capacity of buckling restraint. The lateral resistance of the wall is provided by one-layer thin low yield point (LYP) steel plate and one-layer thin structural steel plate, and timber cover plates on both sides provide a buckling restraint to prevent the out-of-plane buckling deformation of the thin steel plate. The grain of the timber cover plate is obliquely arranged along the direction of the tension field of the steel plate to make full use of the material properties of the timber structure. Moreover, the timber cover plate is fixed to the thin steel plate through the self-tapping screws, which is convenient in construction and can fully utilize the advantages of timber. By changing the size and thickness of the steel plate, the thickness of the timber cover plate, and the arrangement of the self-tapping screws, the lateral performance of the shear wall can be designed to meet different demands, so it is ensured that the shear wall has a good bearing capacity and stiffness. The bearing capacity of the shear wall can be improved by increasing the thickness of the steel plates, the number of layers of the thin steel plates and the thickness of the timber cover plates, and it is convenient to adjust the performance. And, the steel plate is only connected with upper and lower side edge members, so the requirements of different widths of the shear wall can be met by assembling steel plates and timber cover plates transversely, and it is convenient to adjust the size. The reserved slotted holes formed in upper and lower sides of the structural steel plate and configured for connecting the edge frame beam can ensure that the structural steel plate has certain sliding space during lateral resistance, avoiding early involvement in lateral resistance, thus achieving the concept of multistage fortification. In addition, all components of the steel-timber composite shear wall with layered steel plates and timber cover plates can be prefabricated in factories, and only self-tapping screws need to be installed to assemble the components in the engineering site, thus achieving a high assembly degree and convenient construction.

Some embodiments of the present disclosure have been described in detail above. It should be understood that numerous modifications and variations can be made by those skilled in the art without creative work following the idea of the present disclosure. Therefore, all technical solutions which can be obtained by those skilled in the art through logistic analysis, reasoning or limited experimentation on the basis of the prior art in accordance with the idea of the present disclosure fall into the scope of protection determined by the claims.

What is claimed is:

1. A steel-timber composite shear wall with layered steel plates and timber cover plates, comprising a first thin low yield point (LYP) steel plate (1), a rubber layer (3), and a second thin structural steel plate (2), wherein the first thin low yield point (LYP) steel plate (1) and the second thin structural steel plate (2) are arranged on both sides of the rubber layer (3), the steel-timber composite shear wall further comprises a first timber cover plate (4) and a second timber cover plate (5), the first timber cover plate (4) is arranged outside the first thin low yield point (LYP) steel plate (1), the second timber cover plate (5) is arranged outside the second thin structural steel plate (2), the steel plates are fixed with the timber cover plates through self-tapping screws (6), a grain direction of the first timber cover plate (4) and a grain direction of the second timber cover plate (5) are arranged at an oblique angle, said oblique angle is defined by the height and width of a corresponding timber cover plate.

2. The steel-timber composite shear wall with layered steel plates and timber cover plates according to claim 1, wherein the grain direction of the first timber cover plate (4) is opposite to the grain direction of the second timber cover plate (5).

3. The steel-timber composite shear wall with layered steel plates and timber cover plates according to claim 1, wherein the oblique angle of the timber grains of the first timber cover plate (4) and the second timber cover plate (5) is indicated by a formula as follows: α=H/B, wherein α is an oblique angle, H is a height of the timber cover plate, and B is a width of the timber cover plate.

4. The steel-timber composite shear wall with layered steel plates and timber cover plates according to claim 1, wherein the first thin low yield point (LYP) steel plate (1) and the second thin structural steel plate (2) are connected to frame beams through connectors.

5. The steel-timber composite shear wall with layered steel plates and timber cover plates according to claim 4, wherein the distance between upper and lower sides of the timber cover plates is shorter than that of the steel plates; gaps are formed between the steel plates and the frame beam, and the connectors are mounted in the gaps.

6. The steel-timber composite shear wall with layered steel plates and timber cover plates according to claim 5, wherein first bolt holes (11) are formed in upper and lower sides of the first thin low yield point (LYP) steel plate (1), and second bolt holes (21) are formed in upper and lower sides of the second thin structural steel plate (2); high-strength bolts pass through the first bolt holes (11) and the second bolt holes (21) to fix the steel plates, the connectors, and the frame beam together.

7. The steel-timber composite shear wall with layered steel plates and timber cover plates according to claim 5, wherein the first bolt holes (11) in the first thin low yield point (LYP) steel plate (1) are circular holes.

8. The steel-timber composite shear wall with layered steel plates and timber cover plates according to claim 5, wherein the second bolt holes (21) in the second thin structural steel plate (2) are long-circular holes.

9. The steel-timber composite shear wall with layered steel plates and timber cover plates according to claim 1, wherein the first thin low yield point (LYP) steel plate (1), the rubber layer (3) and the second thin structural steel plate (2) are connected with the first timber cover plate (4) and the second timber cover plate (5) through the self-tapping screws (6).

10. The steel-timber composite shear wall with layered steel plates and timber cover plates according to claim 1, wherein the self-tapping screws (6) are inserted from surfaces of the timber cover plates on both sides, and the self-tapping screws (6) on one side pass through the steel plate on that side without passing through the steel plate on another side.

* * * * *